(12) United States Patent
Fahey

(10) Patent No.: US 6,295,277 B1
(45) Date of Patent: Sep. 25, 2001

(54) METHOD AND APPARATUS FOR UNAMBIGUOUS TOPOLOGICAL DETERMINANCY IN AN UNPOWERED STACK CONFIGURATION

(75) Inventor: Dennis Fahey, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/632,359

(22) Filed: Aug. 3, 2000

Related U.S. Application Data

(63) Continuation of application No. 08/964,601, filed on Nov. 6, 1997, now Pat. No. 6,101,169.
(60) Provisional application No. 60/062,391, filed on Oct. 7, 1997, and provisional application No. 60/058,611, filed on Sep. 10, 1997.

(51) Int. Cl.[7] ................................................. H04J 1/16
(52) U.S. Cl. ............................................ 370/246; 370/501
(58) Field of Search ..................................... 370/246, 445, 370/501; 307/112, 113, 147; 312/223.2, 223.6

(56) References Cited

U.S. PATENT DOCUMENTS

| | | | |
|---|---|---|---|
| 5,388,099 | 2/1995 | Poole | 370/85.12 |
| 5,574,726 | 11/1996 | Chan et al. | 370/85.3 |
| 5,636,214 | 6/1997 | Kranzler et al. | 370/438 |
| 5,805,596 | 9/1998 | Kranzler et al. | 370/445 |
| 5,822,594 | 10/1998 | Leung | 395/750.01 |
| 6,101,169 | * 8/2000 | Fahey | 370/246 |

OTHER PUBLICATIONS

Network Systems Tutorial for IEEE Std 802.3, Repeater Functions and System Design Topology Considerations for Carrier Sense Multiple Access with Collision Detection (CSMA/CD) Local Area Networks (LANs); Section 4, Repeater Functions, pp. 7–14 (1995).
International Standard ISO/IEC 8802–3: 1996(E) ANSI/IEEE Std 802.3, 1996 Edition; Carrier sense multiple access with collision detection (CSMA/DC) access method and physical layer specifications; Section 9, Repeater unit for 10 Mb/s baseband networks, pp. 125–155.

* cited by examiner

*Primary Examiner*—Chau Nguyen
*Assistant Examiner*—D. Trinh
(74) *Attorney, Agent, or Firm*—Van Pelt & Yi LLP

(57) ABSTRACT

A stack position determination circuit in a stackable repeater is disclosed that includes an input connector, an output connector, an initial pin driving circuit, and a pin rotating circuit. The input connector includes a plurality of input connector repeater stack position pins arranged in an hierarchical order so that each input connector repeater stack position pin corresponds to a possible physical position of the repeater in a stack of repeaters. An output connector includes a plurality of output connector repeater stack position pins arranged in an hierarchical order so that each output connector repeater stack position pin corresponds to a possible position of the repeater in a stack of repeaters. An initial pin driving circuit is connected to an initial pin in the input connector repeater stack position pin hierarchical order. The initial pin corresponds to a first position in the stack of repeaters and the initial pin driving circuit is responsive to an initial repeater signal. The initial repeater signal has a state that is indicative of whether the repeater is physically connected in the first position in the stack of repeaters. The pin rotating circuit is connected between the input connector and the output connector. The pin rotating circuit connects each of the plurality of input connector repeater stack position pins to a pin selected from the plurality of output connector repeater stack position pins such that the position of the selected output connector repeater pin is one position lower in the output repeater stack position pin hierarchical order than the corresponding position in the input repeater stack position pin hierarchical order of the input repeater stack position pin that is connected to the selected output repeater stack position pin.

7 Claims, 5 Drawing Sheets

METHOD AND APPARATUS FOR UNAMBIGUOUS TOPOLOGICAL DETERMINANCY IN AN UNPOWERED STACK CONFIGURATION

CROSS REFERENCE TO RELATED APPLICATIONS

This application is a continuation of Ser. No. 08/964,601 filed Nov. 6, 1997 now U.S. Pat. No. 6,101,169.

This application claims priority to U.S. Provisional Patent Application No. 60/058,611 filed Sep. 10, 1997 and U.S. Provisional Patent Application No. 60/062,391 filed Oct. 7, 1997.

This application is related to co-pending U.S. patent application Ser. Nos. 08/965,479, U.S. Pat. No. 6,178,176, U.S. Ser. No. 08/965,330, U.S. Pat. No. 5,961,619, U.S. Ser. No. 08/964,602, U.S. Pat. No. 6,092,214, U.S. Ser. No. 08/965,320, U.S. Pat. No. 5,945,814, U.S. Ser. No. 08/965,460 U.S. Pat. No. 6,108,312 and U.S. Ser. No. 08/965,323, U.S. Pat. No. 6,134,240 which are incorporated herein by reference for all purposes.

BACKGROUND OF THE INVENTION

1. Field of the Invention

The present invention relates generally to methods and apparatuses for unambiguously determining the position of a Fast Ethernet repeater in a repeater stack. More specifically, the invention relates to methods and apparatuses for automatically determining the position of a repeater in a stack of repeaters. When repeaters are plugged into a stack using a stack bus cable, the relative positions of the repeaters may be reconfigured or changed. The present invention enables repeaters in the stick to determine their positions relative to each other, even when one or more of the repeaters are powered off. This information may be used in a number of ways. For example, the information may be used to create an hierarchy of repeaters for the purpose of determining which repeater is to perform some special stack function such as providing the management module for the stack. Also, the information may be used to present a more accurate display to a network manager that reflects all repeaters in the stack, even those that are powered off.

2. Description of the Related Art

The growth of local-area networks (LANs) has been driven by the introduction of Ethernet Technology as well as the availability of powerful, affordable personal computers and workstations. As a result, applications that once were possible only on mainframe computers are now running on LANs. Network speed and availability are critical requirements. However, existing applications and a new generation of multimedia, groupware, imaging, and database products can tax a network running at Ethernet's traditional speed of 10 megabytes per second (Mbps). Moreover, with more applications requiring faster LAN speeds for acceptable performance, network managers increasingly find that high-performance computation platforms and mission-critical applications can overwhelm a 10 Mbps network. Network managers therefore are increasingly implementing high-speed LAN technology.

Fast Ethernet

For organizations with existing Ethernet installations, increasing the network speed to 100 Mbps is preferable to investing in a completely new LAN technology. This user preference has driven the industry's decision to specify a higher-speed Ethernet that operates at 100 Mbps. This higher-speed Ethernet is known as Fast Ethernet.

In July 1993, a group of networking companies joined to form the least Ethernet Alliance. The charter of the group was to draft the 802.3 u 100BaseT specification ("802.3 specification") of the Institute of Electrical and Electronics Engineers (IEEE) and to accelerate market acceptance of Fast Ethernet technology. The final IEEE 802.3 specification was approved in June 1995. Among the other goals of the Fast Ethernet Alliance are: to maintain the Ethernet transmission protocol Carrier Sense Multiple Access Collision Detection (CSMA/CD); to Support popular cabling schemes; and to ensure that Fast Ethernet technology will not require changes to the upper-layer protocols and software that run on LAN workstations. For example, no changes are necessary to Simple Network Management Protocol (SNMP) management software or Management Information Bases (MIBs) in order to implement East Ethernet.

Other high-speed technologies, such as 100 VG-AnyLAN and Asynchronous Transfer Mode (ATM), achieve data rates in excess of 100 Mbps by implementing different protocols that require translation when data moves to and from 10BaseT. Protocol translation requires changing the frame, which often incurs higher latencies when passing through layer 2 (data-link layer) LAN switches.

In many cases, organizations can upgrade to 100BaseT technology without replacing existing wiring. Options for 100BaseT media are the same as those for 10BaseT. They include shielded and unshielded twisted pair (STP and UTP) and fiber. The Media Independent Interface (MII) provides a single interface that can support external transceivers for any of the 100BaseT physical sublayers.

CSMA/CD

Carrier sense-collision detection is widely used in LANs. Many vendors use this technique with Ethernet and the IEEE 802.3 specification. A carrier sense LAN considers all stations as peers, the stations contend for the use of the channel on an equal basis. Before transmitting, the stations monitor the channel to determine if the channel is active (that is, if another station is sending data on the channel). If the channel is idle, any station with data to transmit can send its traffic onto the channel. If the channel is occupied, the stations must defer to the station using the channel.

FIG. 1 depicts a carrier sense-collision detection LAN. Network devices 102, 104, 106, and 108 are attached to a network bus 110. Only one network device at a time is allowed to broadcast over the bus, since if more than one device were to broadcast at the same time, the combination of signals on the bus would likely not be intelligible. For example, assume network devices 102 and 104 want to transmit traffic. Network device 108, however, is currently using the channel, so network devices 102 and 104 must "listen" and defer to the signal from network device 108 which is occupying the bus. When the bus goes idle, network devices 102 and 104 can then attempt to acquire the bus to broadcast their messages.

Because network device 102's transmission requires time to propagate to other network devices, these other network devices might be unaware that network device 102's signal is on the channel. In this situation, network another device, such as device 104 or device 106, transmit its traffic even if network device 102 had already seized the channel alter detecting that the channel was idle. This problem is called the collision window. The collision window is a factor of the propagation delay of the signal and the distance between two competing stations. Propagation delay is the delay that occurs before a network device can detect that another network device is transmitting.

Each network device is capable of transmitting and listening to the channel simultaneously. When two network device signals collide, they create voltage irregularities on the channel, which are sensed by the colliding network devices. The network devices then turn off their transmission and, through an individually randomized wait period, attempt to seize the channel again. Randomized waiting decreases the chances of another collision because it is unlikely that the competing network devices generate the same wait time.

It is important that the total propagation delay not exceed the amount of time that is required to send the smallest size data frame. This allows devices to discard data corrupted by collisions by simply discarding all partial frames. It is therefore not desirable for entire frames of data to be sent before a collision is detected. Carrier sense networks are usually implemented on short-distance LANs because the collision window lengthens as the channel gets longer. Longer channels provide opportunity for the more collisions and can reduce through-put in the network. Generally, a long propagation delay coupled with short frames and high data transfer rates give rise to a greater incidence of collisions. Longer frames can mitigate the effect of long delay, but they reduce the opportunity for competing stations to acquire the channel.

The IEEE 802.3 specification sets a standard minimum frame size of 64 bytes (512 bits). Therefore, it order for a network to comply with the standard, a station on the network must not be able to transmit 64 bytes of data before a collision is detected.

Although Fast Ethernet maintains CSMA/CD, the Ethernet transmission protocol, it reduces the transmission time for each bit by a factor of 10. Thus, the Fast Ethernet packet speed increases tenfold, from 10 Mbps to 100 Mbps. Date can move between Ethernet and Fast Ethernet without requiring protocol translation or software changes, because Fast Ethernet maintains the 10BaseT error control functions as well as the frame format and length.

Repeaters

While some Ethernet applications connect numerous network devices to a network bus that is literally a cable connecting the network devices, it is often more desirable to connect network devices using a repeater or hub. It should be noted that in the following description the term "hub" and the term "repeater" are used interchangeably. The repeater manages collision detection for the network devices so that the network devices need only broadcast messages without detecting collisions. The repeater notifies a network device when a collision occurs during its attempt to transmit. In addition, the repeater implements a star topology so that more devices can be included on the network without violating any cable length restriction and so that many devices can be added or removed from the network efficiently.

An Ethernet repeater is a device that serves as a central station for plugging network devices included in an Ethernet network, hence the term "hub." The Ethernet repeater receives messages from the network devices that are plugged into it and broadcasts (or "repeats") the message to all of the other devices on the network along a network bus if no collision is detected. The repeater monitors network traffic in its collision domain and assumes the responsibility for collision detection. The network devices thus simply broadcast messages to the repeater and do not need to first listen before sending messages. If the repeater has already assigned the network bus to a device, then it notifies the device that tried to broadcast that a collision has occurred so that the network device may try again later. The amount of time that it takes for the repeater to receive a data signal and repeat that data signal out to every port on which the data signal is to be broadcast is referred to as the latency of the repeater.

The 802.3 specification contains maximum latency requirements that cannot be exceeded by a conforming repeater. The maximum permissible latency, combined with the requirements for maximum cable length and restrictions on the number and type of other devices allowed within a collision domain, limits the amount of time that it takes to notify a network device that a collision has occurred, ensuring that the overall 802.3 design criteria is met that all collisions are detected before a complete 64 byte frame is transmitted. If the maximum permissible latency were exceeded by a repeater, then multiple devices in the repeater's collision domain on an 802.3 ethernet network might broadcast complete frames of data before being notified of a collision. As described above, the broadcast of complete frames when a collision occurs would defeat a scheme for discarding data associated with collisions by simply discarding all partial frames.

Thus, minimizing the latency of a repeater is critical if the repeater is to be implemented on a network in accordance with the 802.3 specification. The 100BaseT standard defines two classes of repeaters: Class I and Class II. At most, a collision domain can include one Class I or two Class II repeaters. Including more than one repeater in a single collision domain is sometimes referred to as cascading repeaters. Specifically, in order to conform to the Class II requirement, the latency a repeater must be less than 46 bit times. It should be noted that the standard is expressed in terms of bit times, or the amount of data that could be transmitted on the network during the latency period.

Network Flexibility

The Class II requirement, which allows more than one repeater to be included in a single collision domain, significantly adds flexibility to network topology. Expanding the number of ports available on a network may be accomplished by simply adding a second repeater in the same collision domain as a single existing repeater. No switch is required. By limiting the latency of the two repeaters, it is ensured that collisions can be detected and devices connected to different repeaters can be notified of collisions in time to stop sending data before a complete frame is broadcast.

Because networks tend to constantly change and expand with network devices being added, it would be highly advantageous if, in addition to the Class II feature of allowing two repeaters in a collision domain, it were also possible that each of the two Class II repeaters were expandable or stackable. Additional ports could be added to a first repeater stack that functions as one Class II repeater and then a second stack could be included as a second Class II repeater. Thus, stackability combined with cascadability would provide even greater flexibility for network expansion.

In such a network with stackable and cascadable repeaters, the topology of the network may become confusing. It is important in such a changing network to provide network management tools to aid in visualizing and managing the network. It would be useful if, to that end, a method could be provided for determining how many repeaters are in the stack and which repeater is in which position. In particular, it would be useful if all the repeaters in the stack could be detected and their positions in the stack determined regardless of whether or not some of the repeaters in the stack were powered off.

Prior art methods have started a binary number at the beginning of the stack and have provided a counter at each repeater that increments the number of repeaters. The problem with this approach is that it breaks down when a repeater is turned off and could also give spurious results if repeaters are plugged or unplugged while powered on. In some prior art system, when a repeater is powered off or goes down, that repeater is removed from the network management display, even though it is still present physically. This can cause confusion. What is needed is a reliable way of determining the number and order of repeaters in a stack.

SUMMARY OF THE INVENTION

Accordingly, the present invention enables repeaters in the stack to determine their relative position to each other, even when one or more of the repeaters are powered off. A wiring rotation that includes four wires inside a stack bus cable that connects each of the repeaters in the repeater stack is provided that spins an address bit as the stack bus cable extends from repeater to repeater along the stack.

It should be appreciated that the present invention can be implemented in numerous ways, including as a process, an apparatus, a system, a device a method or a computer readable medium. Several inventive embodiments of the present invention are described below.

In one embodiment, a stack position determination circuit in a stackable repeater includes an input connector, an output connector, an initial pin driving circuit, and a pin rotating circuit. The input connector includes a plurality of input connector repeater stack position pins arranged in an hierarchical order so that each input connector repeater stack position pin corresponds to a possible physical position of the repeater in a stack of repeaters. An output connector includes a plurality of output connector repeater stack position pins arranged in an hierarchical order so that each output connector repeater stack position pin corresponds to a possible position of the repeater in a stack of repeaters. An initial pin driving circuit is connected to an initial pin in the input connector repeater stack position pin hierarchical order. The initial pin corresponds to a first position in the stack of repeaters and the initial pin driving circuit is responsive to an initial repeater signal. The initial repeater signal has a state that is indicative of whether the repeater is physically connected in the first position in the stack of repeaters. The pin rotating circuit is connected between the input connector and the output connector. The pin rotating circuit connects each of the plurality of input connector repeater stack position pins to a pin selected from the plurality of output connector repeater stack position pins such that the position of the selected output connector repeater pin is one position lower in the output repeater stack position pin hierarchical order than the corresponding position in the input repeater stack position pin hierarchical order of the input repeater stack position pin that is connected to the selected output repeater stack position pin. Thus, the initial pin driving circuit drives the initial pin in response to the initial repeater signal and the signal on each input connector repeater stack position pin is rotated to one position lower in the output connector position pin hierarchical order.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In one embodiment, a group of stacked Fast Ethernet repeaters are connected together with cables. This arrangement is particularly desirable because different repeaters can be plugged, unplugged, or exchanged by simply plugging and unplugging the cables. In contrast, an arrangement where repeaters plug directly into one another offers less convenience and flexibility. When stacked repeater units are reconfigured by changing the order in which the cables are plugged, repeaters on the end of the repeater stack synchronous bus may be moved to the middle of the bus or vice versa. Certain repeaters in the stack also may be powered on or off. A system administrator or network management software may desire or need to know the reconfigured topology of the network. Accordingly, the present invention provides a method and apparatus for unambiguously determining the network topology.

Figure 1:
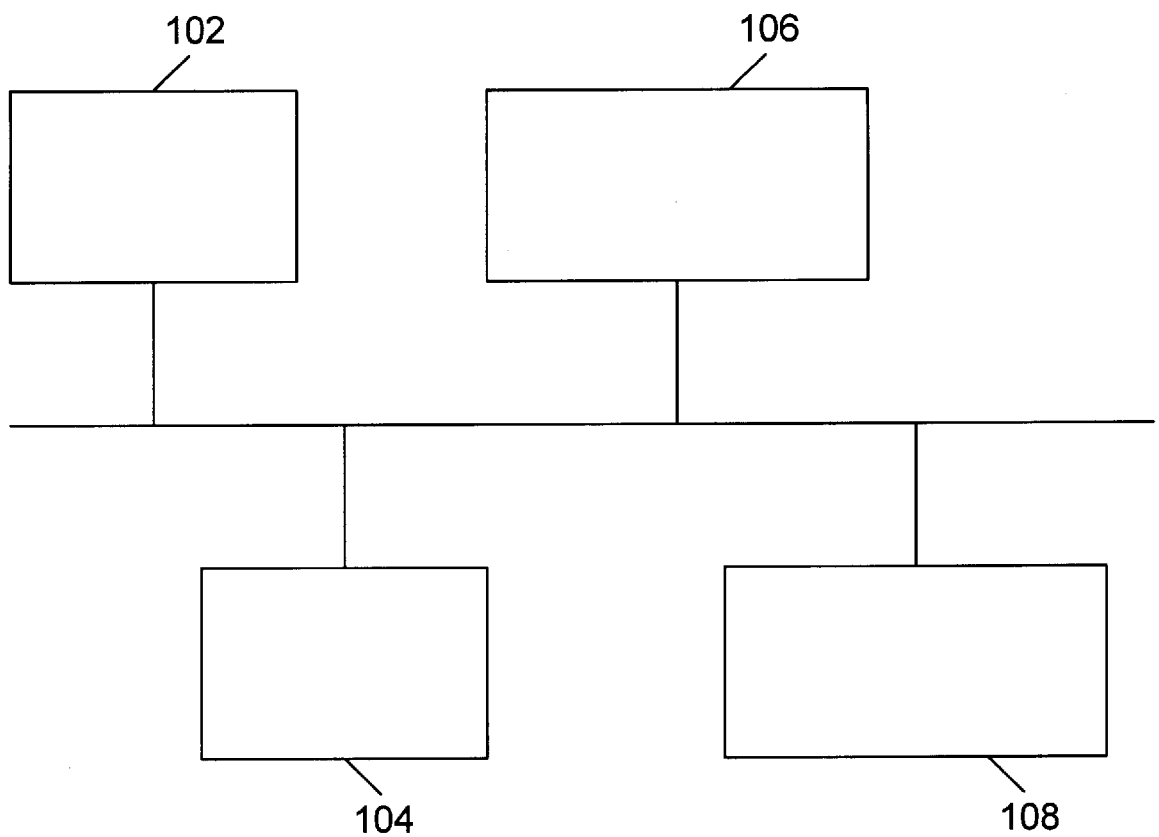
FIG. 1 is a block diagram illustrating a carrier sense-collision detection LAN.
Figure 2:
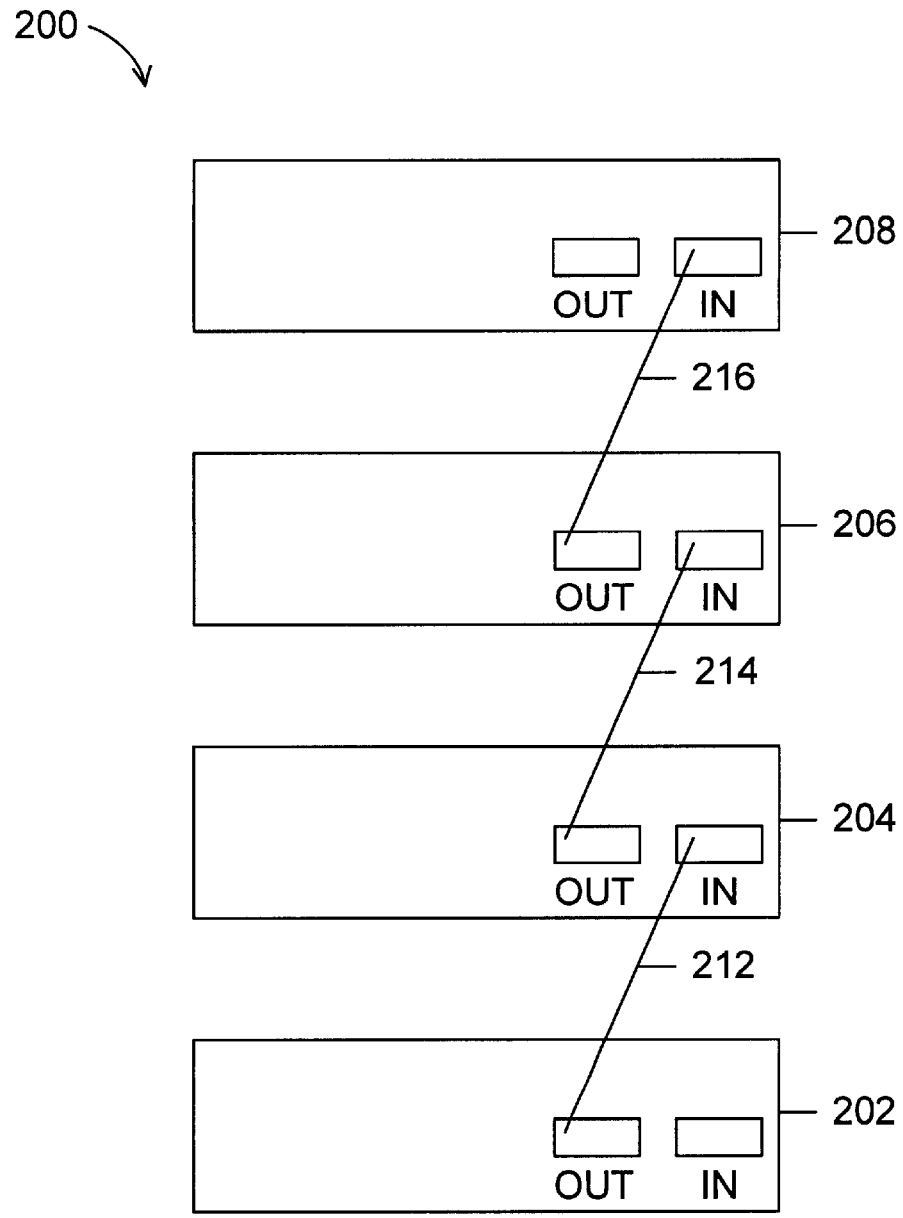
FIG. 2 is a block diagram illustrating a repeater stack.

FIG. 2 is a block diagram illustrating a repeater stack 200. Repeater stack 200 includes a bottom repeater 202, two middle repeaters 204 and 206, and a top repeater 208. Each of the repeaters in the repeater stack are connected to each other via a repeater stack bus that includes a stack bus connection cable 212 connected between repeater 202 and 204, a stack bus connection cable 214 connected between repeater 204 and 206, and a stack bus connection cable 216 connected between repeater 206 and 208. Each of the repeaters includes an input connector and an output connector. The output connector of each repeater in the stack is connected via the stack bus connection cable to the input connector of the repeater above it in the stack. It should be noted that in some embodiments the order of the repeater connectors may be changed. In fact, it is an important advantage of this arrangement that the stack can be reconfigured and the repeaters reordered by simply plugging and unplugging the repeater bus cable.

At the bottom of the repeater stack, repeater 202 has no repeater bus cable connected to its input connector. Likewise, the output connector of repeater 208 at the top of the repeater stack is not connected.

A method of determining which repeaters are located on the ends, that is, the top and bottom of a repeater stack is described in U.S. patent application Ser. No. 08/965,330 which was previously incorporated by reference for all purposes. A top signal that is high is generated in the top repeater in the stack, which, in the embodiment described herein, is arbitrarily considered to be the first repeater in the repeater stack. For all repeaters in the stack except the top repeater, the top signal is low. The top signal is used to designate the first repeater on a set of repeater stack position pins as is described below. It should be noted that a bottom signal is also generated for the bottom repeater in that stack and that in other embodiments, the bottom signal is used to designate the first repeater on a set of repeater stack position pins.

Figure 3A:
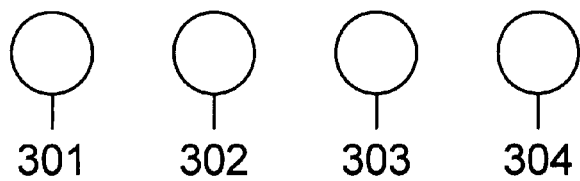
FIG. 3A is a schematic diagram illustrating four repeater stack position pins.

FIG. 3A is a schematic diagram illustrating four repeater stack position pins including a first position pin 301, a second position pin 302, a third position pin 303, and a fourth position pin 304. Each position pin represents a position in the repeater stack. As is described below, the pins are spun or rotated inside the repeater between the repeater input connector and the repeater output connector. Although in the embodiment described herein, the spin of the pins will be described as occurring inside each of the repeaters between the input connector and the output connector of the repeater, it should be recognized that the pins could also be spun by rotating the wires inside a stack bus connection cable that connects the output connector of one repeater to the input connector of another repeater. Spinning the pins inside the repeaters is preferred because it is generally less expensive to switch pins using circuitry on a printed circuit board than it is to change the wiring in the stack bus cable.

Figure 3B:
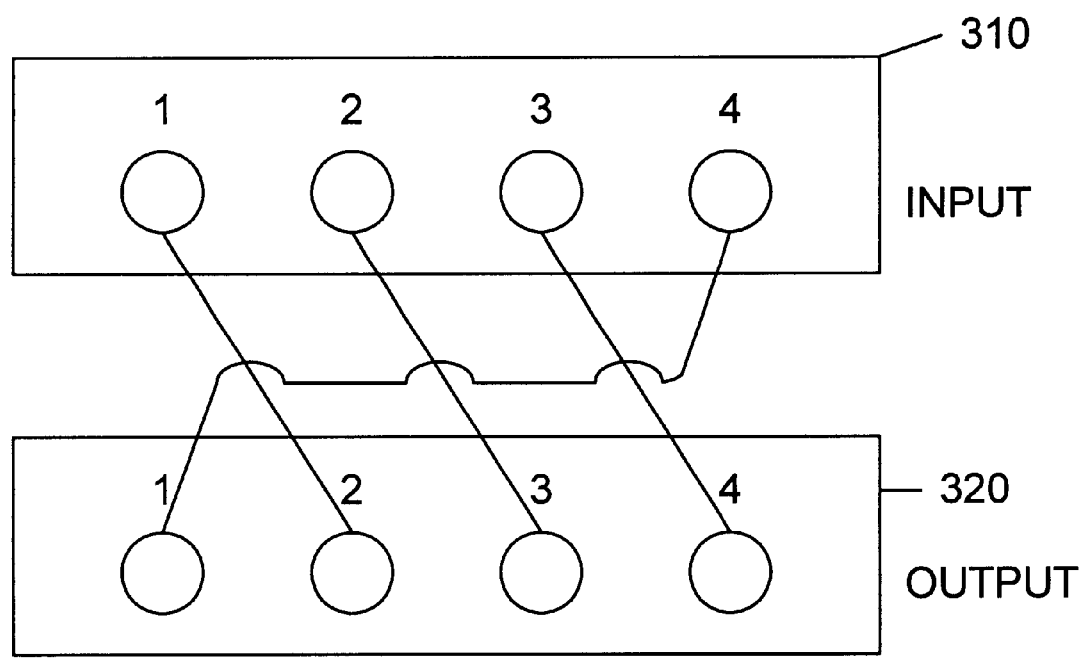
FIG. 3B is a schematic diagram illustrating how the order of four repeater stack position pins is spun between an output connection socket of a repeater and an input connection socket of a repeater.

FIG. 3B is a schematic diagram illustrating how the order of four repeater stack position pins is spun between an input connection socket 310 of a repeater and an output connection socket 320 of a repeater. In the embodiment shown, the position of the pins is each advanced by one position between the input connector and the output connector. That is, the signal on the first pin of the input connector is routed to the second pin of the output connector; the signal on the second pin of the input connector is routed to the third pin of the output connector; the signal on the third pin of the input connector is routed to the fourth pin of the output connector; and the signal on the fourth pin of the input connector is routed to the first pin of the output connector. Thus, whatever signal is on the input connector is shifted by one pin or bit. In different embodiments, the pins may be spun according to different schemes. When the above described scheme is used and when the first pin is caused to be high as is described below, then the position of each repeater in the stack may be read by looking at which of the repeater stack position pins is high at the input connection socket of the repeater. In the embodiment shown, the high signal moves from the first pin of the top repeater to the second pin of the second repeater to the third pin of the third repeater to the fourth pin of the fourth repeater. Thus, the pin number of the high pin corresponds to the position of the repeater in the stack, numbered from the top.

Figure 4:
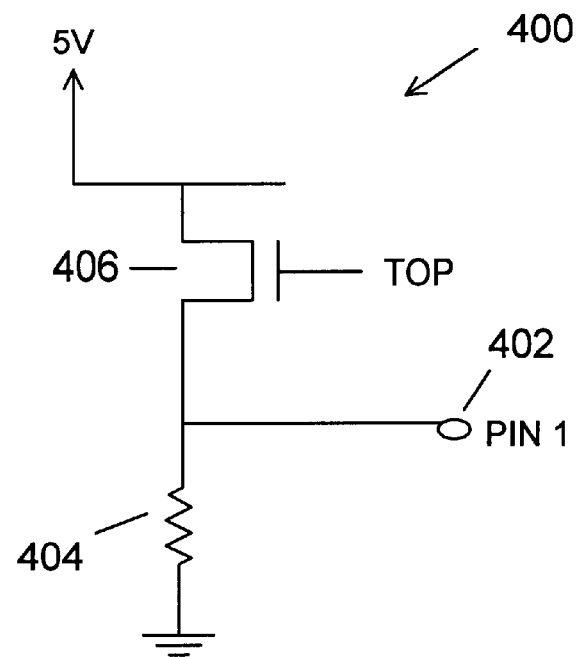
FIG. 4 is a schematic diagram illustrating how the first pin is driven high for the top repeater in the stack bus using the top signal.

FIG. 4 is a schematic diagram illustrating how the first pin is driven high for the top repeater in the stack bus using the top signal. In each repeater an initial pin driving circuit 400 is implemented. A 5V potential is preferably provided from the stack bus connection cable. In one embodiment the termination power pin is used as is described in U.S. patent applications Ser. Nos. 08/965,330 and 08/965,320 which were previously incorporated by reference for all purposes. The advantage of using the termination power pin is that power is available so long as one of the repeaters on the stack is powered on. On each repeater, a first repeater stack position pin is softly pulled down to ground via a pull down resistor 404. The first repeater stack position pin is also connected to the 5V potential through an MOS switch 406. When the top signal is high, then MOS switch 406 is closed and the first repeater stack position pin is pulled high. When the top signal is low, the first repeater stack position pin stays low. Thus, the first repeater stack position pin is pulled high for the top repeater in the repeater stack.

As pointed out above, the position of each repeater in the stack may be determined by which of the repeater stack position pins is high at the input connection socket of the repeater. In other embodiments, the repeater stack position may be determined by which of the repeater stack position pins is high at the output connection socket of the repeater.

Figure 5:
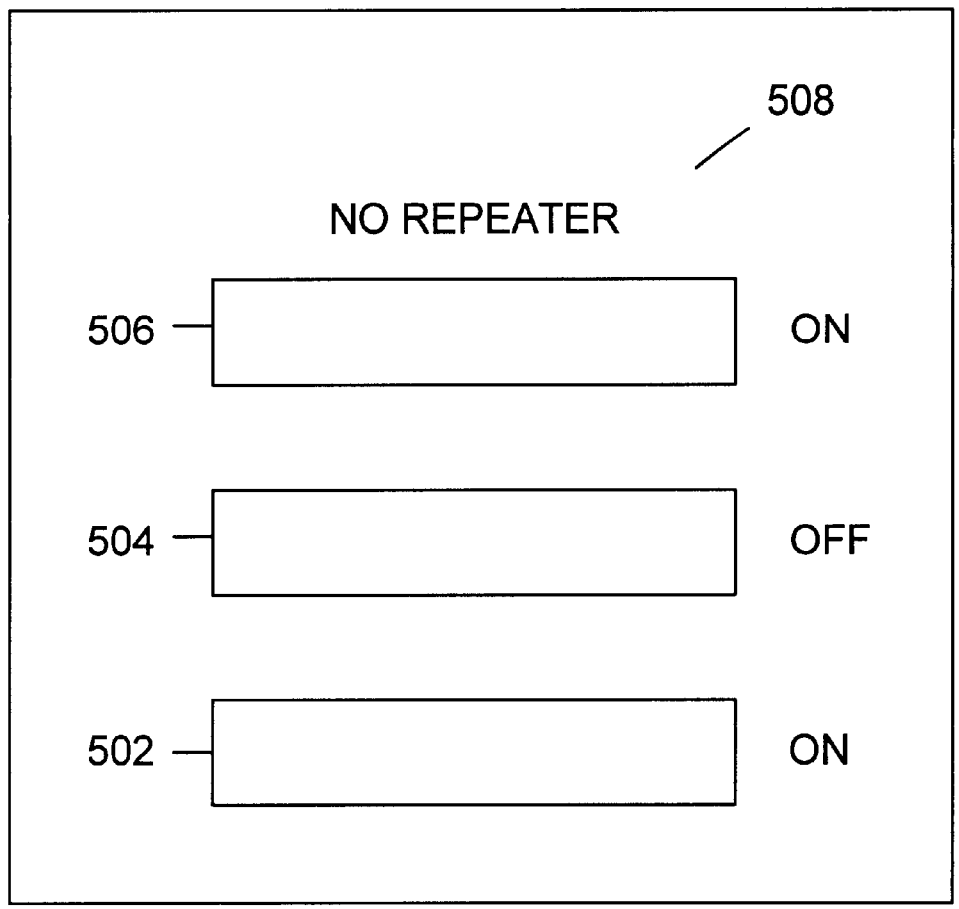
FIG. 5 illustrates a repeater stack display that may be created based on information received about the position of each repeater in a repeater stack.

In one embodiment, the position of each repeater in the stack is reported to a network management module either directly over the stack bus cable or via a network management module bus connecting network management modules. A display is then generated indicating the positions of repeaters in the stack and, preferably the status of each repeater. FIG. 5 illustrates a repeater stack display that may be created based on information received about the position of each repeater in a repeater stack. A bottom repeater 502 is graphically depicted next to a message indicating that the repeater is on. Alternatively, bottom repeater may be lit up to show that it is on and dimmed to indicate that it is off or flashing to indicate that a problem has occurred. A second repeater 504 in the stack is graphically depicted next to a message indicating that the repeater is off. The depiction of a repeater that is off is specifically made possible by the wiring scheme disclosed above. Finally, a third repeater is graphically depicted on top of the stack next to a message indicating that it is on. A no repeater message 508 indicates that there is not a fourth repeater in the stack.

In one embodiment, the position of each repeater in the stack is also used to determine the place in a network management module hierarchy of a network management module plugged into a repeater for the purpose of selecting primary and backup network management modules as is disclosed in U.S. patent application Ser. No. 08/964,602 which was previously incorporated by reference for all purposes.

A wiring rotation scheme has been disclosed for unambiguously determining the topology of an unpowered repeater stack configuration.

Although the foregoing invention has been described in some detail for purposes of clarity of understanding it will be apparent that certain changes and modifications may be practiced within the scope of the appended claims. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A circuit for determining the position of a stackable repeater within a repeater stack, comprising:

an input connector including a plurality of input pins, each input pin corresponding to a position within the repeater stack, the plurality of input pins including an initial pin corresponding to a first position in the repeater stack;

an output connector including a plurality of output pins, each output pin corresponding to a position within the repeater stack;

an initial pin driving circuit connected to the initial pin wherein the initial pin driving circuit is configured to apply to the initial pin a signal that is indicative of whether the repeater is connected in the first position in the repeater stack; and a pin rotating circuit connected between the input connector and the output connector, wherein the pin rotating circuit connects each of the plurality of input pins to the output pin corresponding to the next repeater stack position;

wherein the respective signals on the input pins of the input connector indicate the position of the repeater in the repeater stack.

2. The circuit of claim 1, wherein:

the output pins are connected to the corresponding input pins of a second input connector associated with a next repeater in the repeater stack; and the respective signals on the output pins indicate the position in the repeater stack of the next repeater.

3. The circuit of claim 1, wherein the initial pin driving circuit is responsive to an initial repeater signal, the initial repeater signal having a state that is indicative of whether the repeater is physically connected in the first position in the stack of repeaters.

4. A circuit for determining the position of a stackable repeater within a repeater stack, comprising:

an input connector including a plurality of input pins, each input pin corresponding to a position within the repeater stack, the plurality of input pins including an initial pin corresponding to a first position in the repeater stack;

an output connector including a plurality of output pins, each output pin corresponding to a position within the repeater stack;

an initial pin driving circuit connected to the initial pin wherein the initial pin driving circuit is configured to apply to the initial pin a signal that is indicative of whether the repeater is connected in the first position in the repeater stack; and a pin rotating circuit connected between the input connector and the output connector, wherein the pin rotating circuit connects each of the plurality of input pins to the output pin corresponding to the next repeater stack position;

wherein the respective signals on the output pins of the output connector indicate the position of the repeater in the repeater stack.

5. A circuit for determining the position of a stackable repeater within a repeater stack, comprising:

a plurality of repeaters, each of said repeaters comprising:

an input connector including a plurality of input pins, each input pin corresponding to a position within the repeater stack, the plurality of input pins including an initial pin corresponding to a first position in the repeater stack;

an output connector including a plurality of output pins, each output pin corresponding to a position within the repeater stack; and an initial pin driving circuit connected to the initial pin wherein the initial pin driving circuit is configured to apply to the initial pin a signal that is indicative of whether the repeater is connected in the first position in the repeater stack; and a stack bus cable connecting the output connector of a first one of said plurality of repeaters with the input connector of a second one of said plurality of repeaters, the stack bus cable is configured to connect each of the plurality of output pins to the input pin corresponding to the next repeater stack position;

wherein the respective signals on the input pins of the input connector of each of said plurality of repeaters indicate the position of the repeater in the repeater stack.

6. A stack position determination circuit in a stackable repeater comprising:

means for receiving an input signal indicative of the position of the stackable repeater in the repeater stack;

means for providing an output signal to a next repeater connected in a position that follows the stackable repeater in the repeater stack;

means for generating a first position signal indicative of whether the stackable repeater is physically connected in the first position in the stack of repeaters, said means for generating including means for causing said first position signal to be reflected in said input signal; and means for deriving the output signal from the input signal such that the output signal is indicative of the position in the repeater stack of the next repeater.

7. A method of unambiguously determining the topology of a repeater stack comprising:

a step for generating a first repeater stack position signal in a first repeater that occupies a first position in the repeater stack;

a step for deriving from the first repeater stack position signal an output signal indicative of the physical position of a second repeater that occupies a second position in the repeater stack; and a step for providing the output signal to the second repeater;

whereby the first repeater stack position signal reflects the position in the repeater stack of the first repeater and the output signal reflects the position in the repeater stack of the second repeater regardless of whether the first repeater and the second repeater are powered on.

* * * * *